(12) United States Patent
Sohn et al.

(10) Patent No.: US 11,494,891 B2
(45) Date of Patent: Nov. 8, 2022

(54) METHOD OF INSPECTING AND EVALUATING COATING STATE OF STEEL STRUCTURE AND SYSTEM THEREFOR

(71) Applicant: Korea Advanced Institute of Science and Technology, Daejeon (KR)

(72) Inventors: Hoon Sohn, Daejeon (KR); Soonkyu Hwang, Daejeon (KR); Hyeonjin Kim, Daejeon (KR); Hyung Jin Lim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 192 days.

(21) Appl. No.: 17/128,680

(22) Filed: Dec. 21, 2020

(65) Prior Publication Data

US 2021/0201472 A1    Jul. 1, 2021

(30) Foreign Application Priority Data

Dec. 30, 2019 (KR) .......................... 10-2019-0177318
Oct. 13, 2020 (KR) .......................... 10-2020-0132248

(51) Int. Cl.
*G06K 9/00* (2022.01)
*G06T 7/00* (2017.01)
(Continued)

(52) U.S. Cl.
CPC ............ *G06T 7/0004* (2013.01); *G06K 9/628* (2013.01); *G06T 5/002* (2013.01); *G06T 5/003* (2013.01);
(Continued)

(58) Field of Classification Search
None
See application file for complete search history.

(56) References Cited

U.S. PATENT DOCUMENTS

2020/0271591 A1* 8/2020 Havener ................ G01N 21/94
2020/0333185 A1* 10/2020 Vrabie ...................... G01J 3/28

FOREIGN PATENT DOCUMENTS

JP        2004-037276 A      2/2004
JP        2015227810 A   * 12/2015
(Continued)

*Primary Examiner* — Randolph I Chu
(74) *Attorney, Agent, or Firm* — Daly Crowley Mofford & Durkee, LLP

(57) ABSTRACT

Disclosed are a method of inspecting and evaluating a coating state of a steel structure, and a system therefor. A plurality of vision images and thermal images are acquired. While acquiring the thermal images, a desired region is heated. After the thermal images and the vision images in a dynamic state are reconstructed into a time-spatial-integrated thermal image and a time-spatial-integrated vision image in a static state, respectively, an overlay image is generated by overlaying the two images. A deterioration region of a coating is detected, and coating deterioration is classified by characteristics. A size of the coating deterioration region is quantified. A thickness of the coating is inspected by analyzing thermal energy measured from the time-spatial-integrated thermal image. A coating grade is calculated by comprehensively evaluating a coating deterioration inspection result and a coating thickness inspection result. A state evaluation report for the steel structure is automatically created.

20 Claims, 10 Drawing Sheets

(51) Int. Cl.
  *G06T 7/62*  (2017.01)
  *G06T 7/11*  (2017.01)
  *G06T 7/70*  (2017.01)
  *G06K 9/62*  (2022.01)
  *G06T 5/00*  (2006.01)
  *G06T 5/20*  (2006.01)
  *G06T 11/00*  (2006.01)
  *H04N 5/30*  (2006.01)
  *G06V 10/25*  (2022.01)

(52) U.S. Cl.
  CPC .................. *G06T 5/20* (2013.01); *G06T 7/11* (2017.01); *G06T 7/62* (2017.01); *G06T 7/70* (2017.01); *G06T 11/00* (2013.01); *G06V 10/25* (2022.01); *H04N 5/30* (2013.01); *G06T 2207/20081* (2013.01); *G06T 2207/20084* (2013.01); *G06T 2207/30136* (2013.01)

(56) References Cited

FOREIGN PATENT DOCUMENTS

KR    10-1877480 B1    8/2018
KR    10-2019-0142626 A    12/2019

\* cited by examiner

METHOD OF INSPECTING AND EVALUATING COATING STATE OF STEEL STRUCTURE AND SYSTEM THEREFOR

CROSS-REFERENCE TO RELATED APPLICATION

This application claims priorities under 35 USC § 119 to Korean Patent Application No. 10-2019-0177318 filed on Dec. 30, 2019 and Korean Patent Application No. 10-2020-0132248 filed on Oct. 13, 2020 in the Korean Intellectual Property Office (KIPO), the entire disclosure of which is incorporated herein by reference.

BACKGROUND

1. Field

The present disclosure relates to a technology for inspecting and evaluating a coating state of a structure, and more particularly, to a method of inspecting and evaluating a coating state and a system therefor, capable of evaluating durability by inspecting a state of a coating applied to a structure.

2. Description of the Related Art

In general, for example, a steel structure or the like may be painted on a surface thereof for various purposes such as corrosion prevention. Regarding safety of a structure, an operation of inspecting and evaluating a thickness degree and/or a deterioration state of a coating of the structure is a process essentially required to check durability of the structure and ensure the safety.

In order to check the durability of the structure by measuring a thickness of a coating, equipment using ultrasonic waves has been developed. However, the equipment can measure only a local region within 3 to 5 mm, and an inspection result may vary depending on a skill level of a user, so that the inspection result may lack objectivity.

In addition, visual inspection and an artificial intelligence-based inspection technique using a vision camera have been developed for detecting and classifying the deterioration state of the coating. The visual inspection shows low reliability of the inspection result because subjectivity of an inspector may be involved. The artificial intelligence-based inspection technique using the vision camera may detect only deterioration of a surface of the coating without detecting deterioration of an inside of the coating. In other words, most techniques may detect and discriminate only corrosion and delamination occurring on the surface of the structure.

There are various characteristics or types of the deterioration of the coating. The deterioration may be classified into corrosion, delamination, checking, and chalking. Depending on the characteristics of the deterioration, influence upon the safety of the structure may vary, and an action to be taken for the safety may also vary. Therefore, it is necessary to accurately identify a type of detected deterioration rather than to merely detect the deterioration of the coating.

SUMMARY

An object of the present disclosure is to provide a method of inspecting and evaluating a coating state and a system therefor, capable of visualizing and quantifying a thickness of a coating over an entire region of a structure by using both a thermal imaging system and a vision system, comprehensively and efficiently detecting deterioration of various characteristics that may occur inside and outside the coating, classifying the deterioration by characteristics, evaluating the coating state based on inspection results, and automatically creating related reports.

The object to be achieved by the present disclosure is not limited to the above-described one, and may be variously expanded without departing from the spirit and scope of the present disclosure.

According to one aspect of embodiments of the present disclosure, a method of inspecting and evaluating a coating state is a method for inspecting a coating state of an inspection target steel structure to which a coating is applied. The method of inspecting and evaluating the coating state includes: acquiring a plurality of vision images by photographing a desired region of a surface of the steel structure by using a vision camera; acquiring a plurality of thermal images by heating the desired region of the steel structure and photographing the heated desired region of the surface of the steel structure by using a thermal imaging camera; performing preprocessing of reconstructing the thermal images and the vision images in a dynamic state into a time-spatial-integrated thermal image and a time-spatial-integrated vision image in a static state, respectively, by performing coordinate transformation according to a time-spatial-integrated coordinate transformation (TSICT) algorithm; generating an overlay image by overlaying the time-spatial-integrated vision image with the time-spatial-integrated thermal image; detecting deterioration of the coating applied to the steel structure by inputting the overlay image to an artificial intelligence-based coating deterioration detection model constructed by learning a plurality of learning overlay images in advance based on an artificial neural network; classifying the deterioration of the coating of the steel structure by characteristics by inputting an image of a coating deterioration region determined according to a position of the detected coating deterioration to a coating deterioration classification model; quantifying a size of the deterioration region by processing the image of the coating deterioration region; generating a coating deterioration inspection result by combining a result of classifying the coating deterioration by the characteristics and a quantification result; inspecting a thickness of the coating of the steel structure by analyzing thermal energy measured from the time-spatial-integrated thermal image based on a coating thickness inspection algorithm; and calculating a coating grade by comprehensively evaluating a deterioration state inspection result of the coating and a thickness inspection result of the coating based on a predetermined coating evaluation criterion.

In an example embodiment, the predetermined coating evaluation criterion may include at least one of an image of the surface of the steel structure in a normal state, member information of the steel structure, a specification, and a number of snowfalls.

In an example embodiment, the method may further include automatically creating a state evaluation report for the steel structure by combining the calculated coating grade with additional information related to the steel structure.

In an example embodiment, the automatically creating of the state evaluation report may include: evaluating durability performance of the steel structure by using the calculated coating grade and the additional information related to the steel structure as input variables; evaluating safety performance and use performance of the steel structure; calculating a comprehensive evaluation score and a comprehensive evaluation grade for the steel structure by combining a durability performance evaluation result of the steel structure with a safety performance evaluation result and a use performance evaluation result of the steel structure; and automatically creating a comprehensive state evaluation report for the steel structure and the coating according to a predetermined report creation scheme.

In an example embodiment, the coating deterioration may be classified into corrosion, delamination, checking, and chalking according to the characteristics of the coating deterioration.

In an example embodiment, the desired region may be photographed while the vision camera, a heat source, and the thermal imaging camera are mounted together on an unmanned moving body and move relatively to the surface of the steel structure.

In an example embodiment, the generating of the overlay image may include: acquiring a vision image and a thermal image of a target surface on which reference points are displayed by photographing the target surface by using the vision camera and the thermal imaging camera, respectively; obtaining a transformation matrix for the reference points included in the vision image based on the reference points included in the thermal image; transforming the vision image of the surface of the steel structure by using the transformation matrix; and obtaining the overlay image by overlaying the transformed vision image of the surface of the steel structure with the thermal image of the surface of the steel structure.

In an example embodiment, the obtaining of the transformation matrix may include: detecting first reference points and second reference points within the thermal image and the vision image, respectively; correcting distortions of the thermal image and the vision image by using the detected first reference points and the detected second reference points, respectively; obtaining a pixel ratio by using distances between the first reference points and between the second reference points in the thermal image and the vision image that are subject to the distortion correction; cutting a region of interest (ROI) of the vision image corresponding to an ROI of the thermal image; allowing the cut ROI of the vision image to have a same number of pixels as the ROI of the thermal image by reducing the cut ROI of the vision image according to the pixel ratio; redetecting the first reference points and the second reference points in the regions of interest of the thermal image and the vision image, respectively; and setting the redetected first reference points and the redetected second reference points as fixed points and moving points, respectively, to obtain the transformation matrix for mating moving points based on the fixed points.

In an example embodiment, the cutting of the ROI of the vision image may include: obtaining numbers of pixels from the first reference points of the thermal image to borders of the thermal image; calculating numbers of pixels from the second reference points to borders within the vision image by using the obtained numbers of pixels and the pixel ratio; obtaining a border corresponding to the ROI of the thermal image in the vision image by using the calculated numbers of pixels from the second reference points to the borders; and cutting only the ROI of the vision image defined by the obtained border.

In an example embodiment, the quantifying of the size of the deterioration region may include: performing a process of emphasizing a feature of the overlay image including an image color by using a sharpening mask; transforming the overlay image in which the feature is emphasized into a grayscale overlay image; filtering the overlay image transformed into grayscale by applying a median filter having a predetermined size to the overlay image transformed into grayscale; generating a black-and-white image in which each pixel has a value of 0 or 1 depending on whether the pixel corresponds to the deterioration region by binarizing the filtered overlay image; counting a number of pixels corresponding to the deterioration region in the black-and-white image; and quantifying a size of a deterioration area by multiplying the counted number of pixels by a pixel resolution.

In an example embodiment, the inspecting of the thickness of the coating of the steel structure may include: removing a thermal image component caused by a noise heat source by subtracting a time-spatial-integrated thermal image captured before thermal energy of a heat source is applied to the steel structure from a time-spatial-integrated thermal image captured while the thermal energy of the heat source is applied to the steel structure; and measuring the thickness of the coating of the steel structure by using the time-spatial-integrated thermal image from which a noise component is removed based on Fourier's heat conduction equation expressed by $L=Q/k A \Delta T t^*$, where Q denotes thermal energy reflected after heating, $\Delta T$ denotes a temperature increment of a coating caused by an applied heat source, k denotes thermal conductivity of a coating, L denotes a thickness of a coating, and $t^*$ denotes a thermal wave propagating time.

Meanwhile, according to another aspect of the embodiments of the present disclosure, a system for inspecting and evaluating a coating state includes a vision camera, an exciter, a thermal imaging camera, a moving unit, and a control unit. The vision camera may be configured to acquire a plurality of vision images by photographing a desired region of a surface of an inspection target steel structure to which a coating is applied. The exciter may be configured to heat the steel structure by irradiating a heat source to the steel structure. The thermal imaging camera may be configured to acquire a plurality of thermal images by photographing the desired region of the surface of the steel structure heated by the exciter. The moving unit may include an unmanned moving body and a moving body controller. The unmanned moving body may be configured to provide a movement while maintaining a desired interval with respect to the surface of the steel structure in a state where the vision camera, the thermal imaging camera, and the exciter are mounted on the unmanned moving body so as to allow the vision camera and the thermal imaging camera to photograph the desired region. The moving body controller may be configured to control the movement of the unmanned moving body. The control unit may be configured to execute a computer program to inspect the coating state of the steel structure.

The computer program includes: a preprocessing function of reconstructing the thermal images and the vision images in a dynamic state, which are provided by the vision camera and the thermal imaging camera, into a time-spatial-integrated thermal image and a time-spatial-integrated vision image in a static state, respectively, by performing coordinate transformation according to a time-spatial-integrated coordinate transformation (TSICT) algorithm; a function of generating an overlay image by overlaying the time-spatial-integrated vision image with the time-spatial-integrated thermal image; a function of detecting deterioration of the coating applied to the steel structure by inputting the overlay image to an artificial intelligence-based coating deterioration detection model constructed by learning a plurality of learning overlay images in advance based on an artificial neural network; a function of classifying the deterioration of the coating of the steel structure by characteristics by inputting an image of a coating deterioration region determined according to a position of the detected coating deterioration to a coating deterioration classification model; a function of quantifying a size of the deterioration region by processing the image of the coating deterioration region; a function of generating a coating deterioration inspection result by combining a result of classifying the coating deterioration by the characteristics and a quantification result; a function of inspecting a thickness of the coating of the steel structure by analyzing thermal energy measured from the time-spatial-integrated thermal image based on a coating thickness inspection algorithm; and a function of calculating a coating grade by comprehensively evaluating a deterioration state inspection result of the coating and a thickness inspection result of the coating based on a predetermined coating evaluation criterion.

In an example embodiment, the computer program may further include a function of automatically creating a state evaluation report for the steel structure by combining the calculated coating grade with additional information related to the steel structure.

In an example embodiment, the function of automatically creating the state evaluation report may include: a function of evaluating durability performance of the steel structure by using the calculated coating grade and the additional information related to the steel structure as input variables; a function of evaluating safety performance and use performance of the steel structure; a function of calculating a comprehensive evaluation score and a comprehensive evaluation grade for the steel structure by combining a durability performance evaluation result of the steel structure with a safety performance evaluation result and a use performance evaluation result of the steel structure; and a function of automatically creating a comprehensive state evaluation report for the steel structure and the coating according to a predetermined report creation scheme.

In an example embodiment, the unmanned moving body may include a mobile robot having at least one wheel formed of a permanent magnet and configured to move while being attached to the steel structure by an attractive force that acts between the permanent magnet wheel and the steel structure.

In an example embodiment, the function of generating the overlay image may include: a function of receiving a vision image and a thermal image provided by photographing a target surface on which reference points are displayed by the vision camera and the thermal imaging camera, respectively; a function of obtaining a transformation matrix for the reference points included in the vision image based on the reference points included in the thermal image; a function of transforming the vision image of the surface of the steel structure by using the transformation matrix; and a function of obtaining the overlay image by overlaying the transformed vision image of the surface of the steel structure with the thermal image of the surface of the steel structure.

In an example embodiment, the function of obtaining the transformation matrix may include: a function of detecting first reference points and second reference points within the thermal image and the vision image, respectively; a function of correcting distortions of the thermal image and the vision image by using the detected first reference points and the detected second reference points, respectively; a function of obtaining a pixel ratio by using distances between the first reference points and between the second reference points in the thermal image and the vision image that are subject to the distortion correction; a function of cutting a region of interest (ROI) of the vision image corresponding to an ROI of the thermal image; a function of allowing the cut ROI of the vision image to have a same number of pixels as the ROI of the thermal image by reducing the cut ROI of the vision image according to the pixel ratio; a function of redetecting the first reference points and the second reference points in the regions of interest of the thermal image and the vision image, respectively; and a function of setting the redetected first reference points and the redetected second reference points as fixed points and moving points, respectively, to obtain the transformation matrix for mating moving points based on the fixed points.

In an example embodiment, the function of quantifying the size of the deterioration region may include: a function of performing a process of emphasizing a feature of the overlay image including an image color by using a sharpening mask; a function of transforming the overlay image in which the feature is emphasized into a grayscale overlay image; a function of filtering the overlay image transformed into grayscale by applying a median filter having a predetermined size to the overlay image transformed into grayscale; a function of generating a black-and-white image in which each pixel has a value of 0 or 1 depending on whether the pixel corresponds to the deterioration region by binarizing the filtered overlay image; a function of counting a number of pixels corresponding to the deterioration region in the black-and-white image; and a function of quantifying a size of a deterioration area by multiplying the counted number of pixels by a pixel resolution.

In an example embodiment, the function of inspecting the thickness of the coating of the steel structure includes: a function of removing a thermal image component caused by a noise heat source by subtracting a time-spatial-integrated thermal image captured before thermal energy of a heat source is applied to the steel structure from a time-spatial-integrated thermal image captured while the thermal energy of the heat source is applied to the steel structure; and a function of measuring the thickness of the coating of the steel structure by using the time-spatial-integrated thermal image from which a noise component is removed based on Fourier's heat conduction equation expressed by $L=Q/kA\Delta Tt^*$, where Q denotes thermal energy reflected after heating, $\Delta T$ denotes a temperature increment of a coating caused by an applied heat source, k denotes thermal conductivity of a coating, L denotes a thickness of a coating, and $t^*$ denotes a thermal wave propagating time.

In an example embodiment, the system may further include a display for displaying an image provided by the control unit; and a driving check camera mounted on the unmanned moving body to capture an image of a region where the unmanned moving body is to be driven and provide the captured image to the control unit in real time so that the captured image is displayed on the display.

According to the embodiments of the present disclosure, the overlay image generated by overlaying the vision image of the coating applied to the structure with the thermal image captured while heating the structure is analyzed, so that a deterioration progression state inside the coating as well as outside the coating can be comprehensively inspected. In addition, the unmanned moving body is provided to move a coating state inspection position, so that coating state inspection can be performed over the entire region of the structure.

According to the embodiments of the present disclosure, the deterioration of the coating of the structure can be detected by using a deterioration detection artificial intelligence algorithm for detecting the deterioration of the coating. In addition, according to the present disclosure, a separate deterioration classification artificial intelligence algorithm is constructed rather than merely detecting the deterioration, and the detected deterioration is automatically classified into corrosion, delamination, checking, chalking, and the like according to the characteristics based on the deterioration classification artificial intelligence algorithm, so that objectivity of the coating state inspection can be ensured. While detecting the deterioration of the coating by using the deterioration detection artificial intelligence algorithm, instead of separately detecting the thermal image and the vision image (an individual detection scheme), a scheme of detecting an image obtained by overlaying the two images is performed. Compared to the individual detection scheme, this scheme can significantly reduce a computing running time required for the detection of the deterioration.

Furthermore, according to the embodiments of the present disclosure, a coating state evaluation report for the structure is automatically created by combining a deterioration state inspection result of the coating, a coating thickness inspection result, and additional information related to the structure, so that objectivity of coating state evaluation can be ensured, and work efficiency can be improved.

DETAILED DESCRIPTION OF THE EMBODIMENTS

Figure 1:
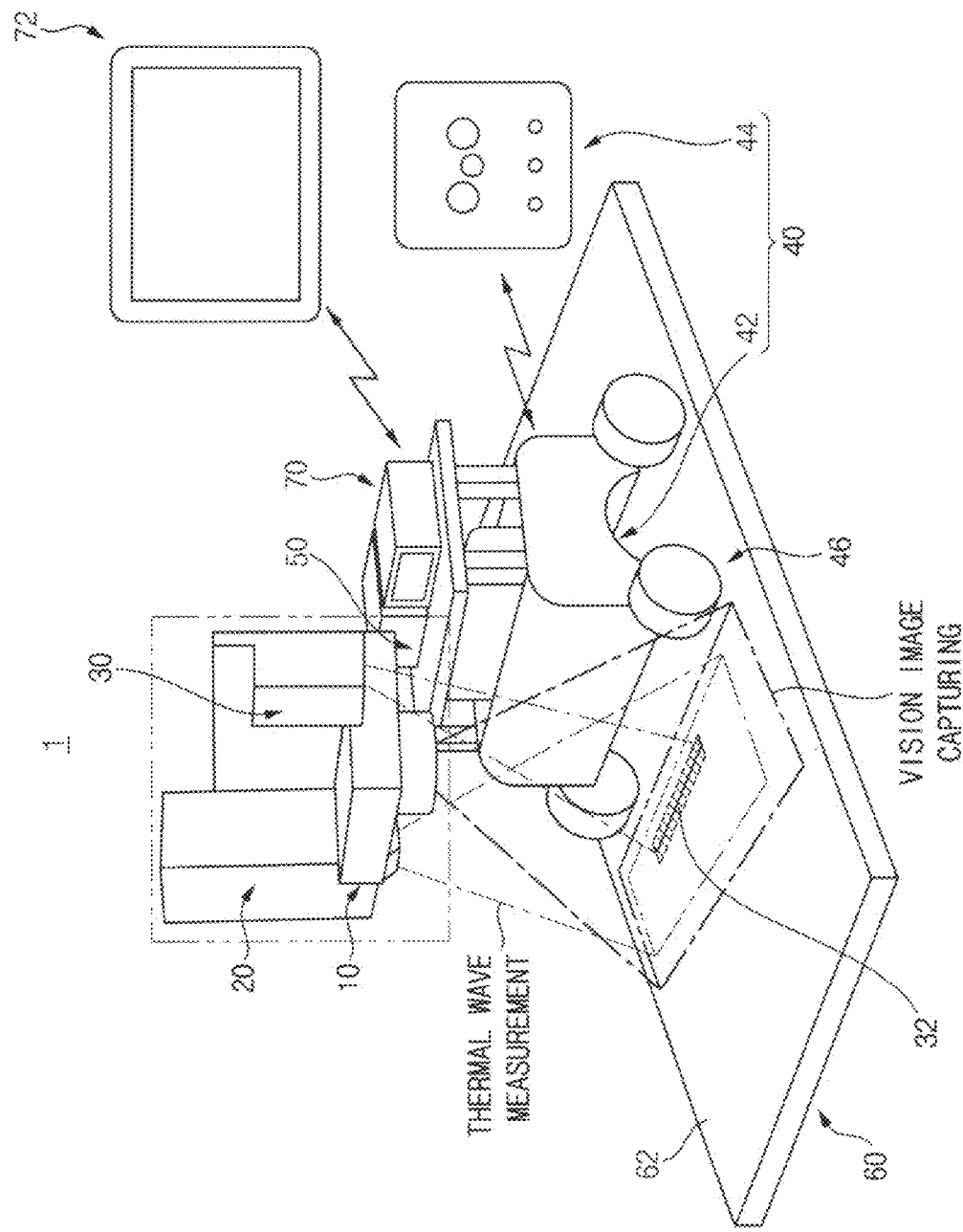
FIG. 1 shows a conceptual configuration of a coating state evaluation system according to one embodiment of the present disclosure.

Hereinafter, embodiments of the present disclosure will be described in detail with reference to the accompanying drawings. The present disclosure may be implemented in various different forms, and is not limited to the embodiments described herein. In the drawings, parts irrelevant to the description are omitted in order to clearly describe the present disclosure, and the same reference numerals are assigned to the same or similar elements throughout the specification.

FIG. 1 conceptually shows a configuration of a coating state evaluation system 1 according to one embodiment of the present disclosure.

Referring to FIG. 1, according to one embodiment of the present disclosure, the coating state evaluation system 1 may be a system for evaluating safety of a structure, and may be configured to automatically evaluate durability of a structure 60 by measuring and inspecting an overall state of a coating applied to the structure 60, especially a thickness, a deterioration state, and the like of the coating. Furthermore, the system 1 may be configured to automatically create a state evaluation report based on a result of the evaluation. In this case, the structure 60 to be inspected or evaluated by the coating state evaluation system 1 according to one embodiment of the present disclosure may be a steel structure.

The coating state evaluation system 1 according to one embodiment may include a vision camera 10, a thermal imaging camera 20, an exciter 30, a moving unit 40, a driving check camera 50, and a control unit 70.

The vision camera 10 may be provided to acquire a vision image of a surface 62 of the structure 60 to which the coating is applied by photographing the structure surface 62 while being spaced apart from the structure 60 by a predetermined distance. The vision camera 10 may be disposed on one side of the coating state evaluation system 1. The vision camera 10 may provide the acquired vision image to the control unit 70.

In the control unit 70, the vision image may be used to detect deterioration of the structure surface 62, that is, deterioration such as corrosion or delamination occurring outside the coating, and may be used to detect checking and chalking.

The thermal imaging camera 20 may be provided to acquire a thermal image of the structure 60. The thermal imaging camera 20 may be adjacent to the vision camera 10. In addition, the thermal imaging camera 20 may be adjacent to the exciter 30 that will be described below. The thermal image captured by the thermal imaging camera 20 may be transmitted to the control unit 70. In the control unit 70, the thermal image may be used to measure a temperature of the structure surface 62.

In more detail, first, thermal energy generated from a heat source of the exciter 30 may be transferred to the structure 60. In this case, the transfer of the thermal energy through the heat source of the exciter 30 may be achieved by continuous excitation of a linear laser beam 32. The transferred thermal energy may propagate from the coating of the structure 60 to a steel material part. In this case, the temperature of the structure surface 62 to which the coating is applied may vary depending on a thermal energy propagation degree of the structure 60. The varying surface temperature of the structure surface 62 may be reflected in the thermal image. Therefore, the surface temperature of the structure 60 to which the coating is applied may be measured by acquiring the thermal image of the structure surface 62.

The thermal energy propagation degree of the structure 60 may vary depending on a thickness of the coating. As the thickness of the coating increases, the transfer of the thermal energy to a steel material protected by the coating may become delayed. Therefore, as the thickness of the coating increases, the temperature of the structure surface 62 including the coating may become higher when measured.

Based on the above points, the coating state evaluation system 1 may measure the surface temperature of the structure 60 by using the thermal image of the structure surface 62, and estimate the thickness of the coating from a value of the measured temperature. In addition, deterioration inside the coating may not be detected through the vision image captured by the vision camera 10, but may be detected through the thermal image captured by the thermal imaging camera 20.

In an exemplary embodiment, the coating state evaluation system 1 may be moved by the moving unit 40. As the coating state evaluation system 1 moves, the structure surface 62 may be photographed by the vision camera 10 and the thermal imaging camera 20 a plurality of times in different regions of the structure surface 62. In other words, the vision camera 10 and the thermal imaging camera 20 may detect the deterioration over the entire surface 62 without being limited to a part of the structure 60.

In the exemplary embodiment, the moving unit 40 may include an unmanned moving body 42 and a moving body controller 44 for controlling a movement of the unmanned moving body 42. The moving body controller 44 may communicate with the unmanned moving body 42 by a wireless communication scheme or a wired communication scheme. Through the communication, the moving body controller 44 may remotely control operations related to the movement of the unmanned moving body 42, the photographing of the vision camera 10 and the thermal imaging camera 20, heating of the exciter 30, and the like. The vision camera 10, the thermal imaging camera 20, and the exciter 30 may be coupled to the unmanned moving body 42 or mounted on the unmanned moving body 42 so that they can be integrally moved. The unmanned moving body 42 may provide a movement such that the vision camera 10, the thermal imaging camera 20, and the exciter 30 may move to a desired region of the structure surface 62 while maintaining a desired interval.

The driving check camera 50 may be mounted on the unmanned moving body 42 to photograph a front region where the unmanned moving body 42 is to be driven. An image captured by the driving check camera 50 may be provided to the control unit 70 in real time so as to be displayed on a display 72. An operator of the coating state evaluation system 1 may control the movement of the unmanned moving body 42 by manipulating the moving body controller 44 while viewing a screen displayed on the display 72. Through the above movement control, the vision camera 10 and the thermal imaging camera 20 may perform the photographing while driving the desired region of the inspection target structure 60.

In the exemplary embodiment, as shown in FIG. 1, the unmanned moving body 42 may be a mobile robot having at least one wheel 46 formed of a permanent magnet. In this case, the coating state evaluation system 1 may stably move over an entire region of the structure 60 while being attached to the structure 60 by an attractive force that acts between the permanent magnet wheel 46 and the structure 60 without being separated from the structure 60.

In addition, in one embodiment of the present disclosure, the moving unit 40 may be an unmanned aerial vehicle (UAV). In other words, the vision camera 10, the thermal imaging camera 20, and the exciter 30 may be mounted on the UAV to collect the vision image and the thermal image while flying at a separation distance from the structure surface 62. However, the moving unit 40 applied to the coating state evaluation system 1 is not limited thereto.

In the exemplary embodiment, the control unit 70 may be configured to receive the vision image or the thermal image to evaluate the coating state. The control unit 70 may be a computing device capable of executing a program for receiving a vision image or a thermal image to evaluate a coating state. To this end, the control unit 70 may include computing resources (not shown) such as a central processing unit (CPU), a memory, a communication unit, and a data storage, and a display 72 configured to display an evaluation result and the like and function as a user interface device. The display 72 may be connected to a computing device constituting the control unit 70 to communicate with the computing device by a wireless communication scheme or a wired communication scheme.

Figure 2:
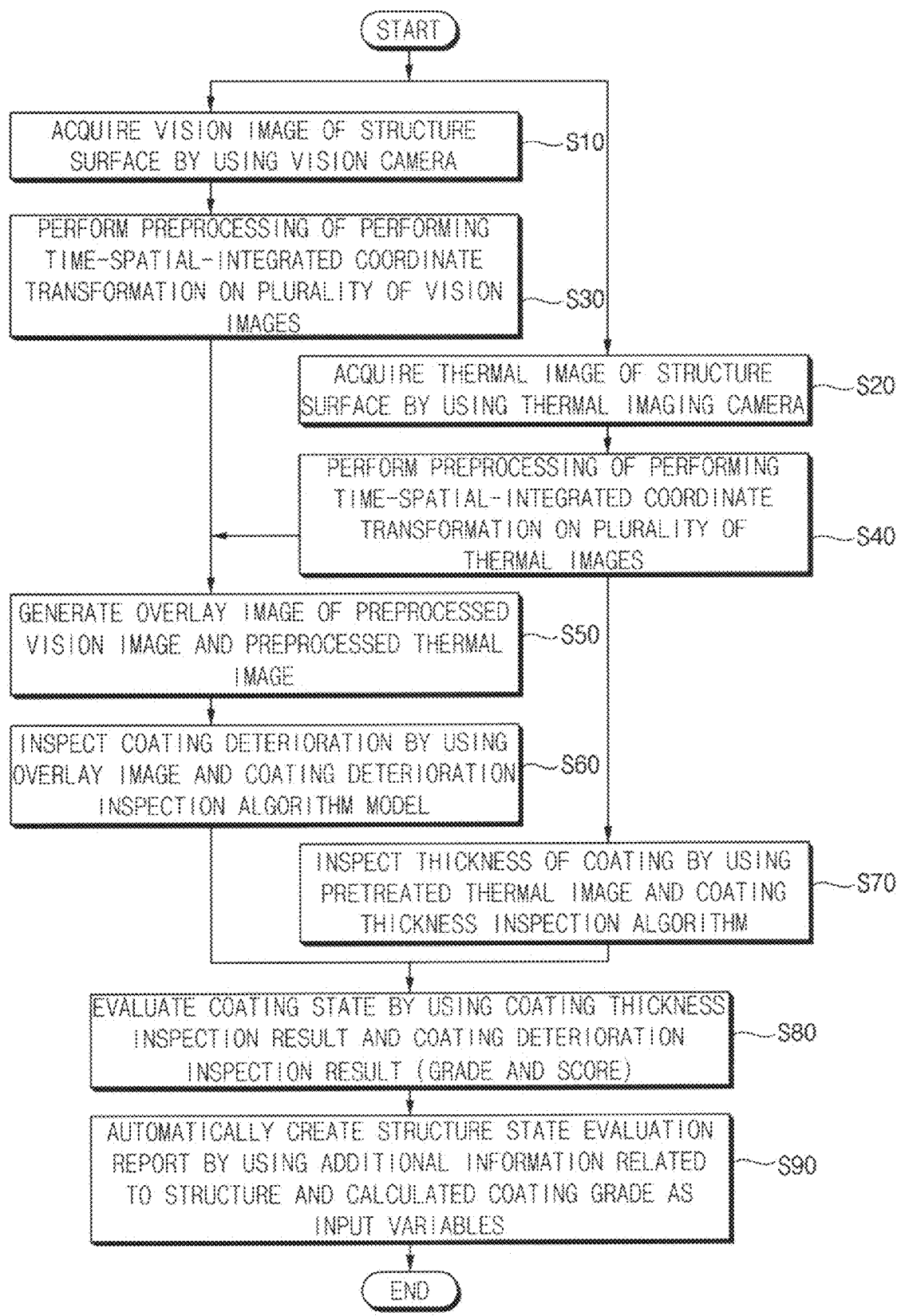
FIG. 2 shows an execution sequence of a method of inspecting a coating state of a structure by using the coating state evaluation system according to one embodiment of the present disclosure.

Next, a method of inspecting a coating state of the structure 60 by the coating state evaluation system 1 by using the control unit 70 will be described. FIG. 2 illustrates an execution sequence of a method of inspecting a coating state of a structure 60 by using the coating state evaluation system 1 according to one embodiment of the present disclosure.

Referring to FIG. 2, the method of inspecting the coating state of the structure 60 by the coating state evaluation system 1 according to one embodiment of the present disclosure may include: acquiring the vision image of the structure surface 62 by photographing the desired region of the structure surface 62 with the vision camera 10 (S10); and acquiring the thermal image of the structure surface 62 by heating the desired region of the structure surface 62 and photographing the heated structure surface 62 with the thermal imaging camera 20 (S20). In the steps S10 and S20, the vision camera 10 and the thermal imaging camera 20 may perform the photographing while moving through the structure surface 62 to generate a plurality of vision images and a plurality of thermal images for various regions. In addition, during the photographing, the vision camera 10 and the thermal imaging camera 20 may simultaneously photograph the same region to acquire the vision image and the thermal image for each photographing region. When the vision image and the thermal image are captured in the steps S10 and S20 by using the vision camera 10 and the thermal imaging camera 20, respectively, the image may be captured while maintaining a predetermined distance between the structure surface 62 and the two cameras 10 and 20 as described above. The control unit 70 may receive the vision image and the thermal image captured by the vision camera 10 and the thermal imaging camera 20 from the vision camera 10 and the thermal imaging camera 20, respectively.

The method may include: preprocessing (S30) of integrating the vision images in a dynamic state captured by the vision camera 10 into a single time-spatial-integrated vision image in a static state by performing coordinate transformation according to a time-spatial-integrated coordinate transformation (TSICT) algorithm; and preprocessing (S40) of integrating the thermal images in a dynamic state captured by the thermal imaging camera 20 into a single time-spatial-integrated thermal image in a static state by performing the coordinate transformation according to the TSICT algorithm. In addition, the method may include: generating an overlay image by overlaying the preprocessed time-spatial-integrated vision image with the preprocessed time-spatial-integrated thermal image by using an image overlaying algorithm (S50); and inspecting a deterioration state of the coating applied to the structure 60 by using the overlay image and a coating deterioration inspection algorithm (S60). Furthermore, the method may include inspecting the thickness of the coating applied to the structure surface 62 by analyzing thermal energy measured from the preprocessed time-spatial-integrated thermal image based on a coating thickness inspection algorithm (S70).

Figure 3:
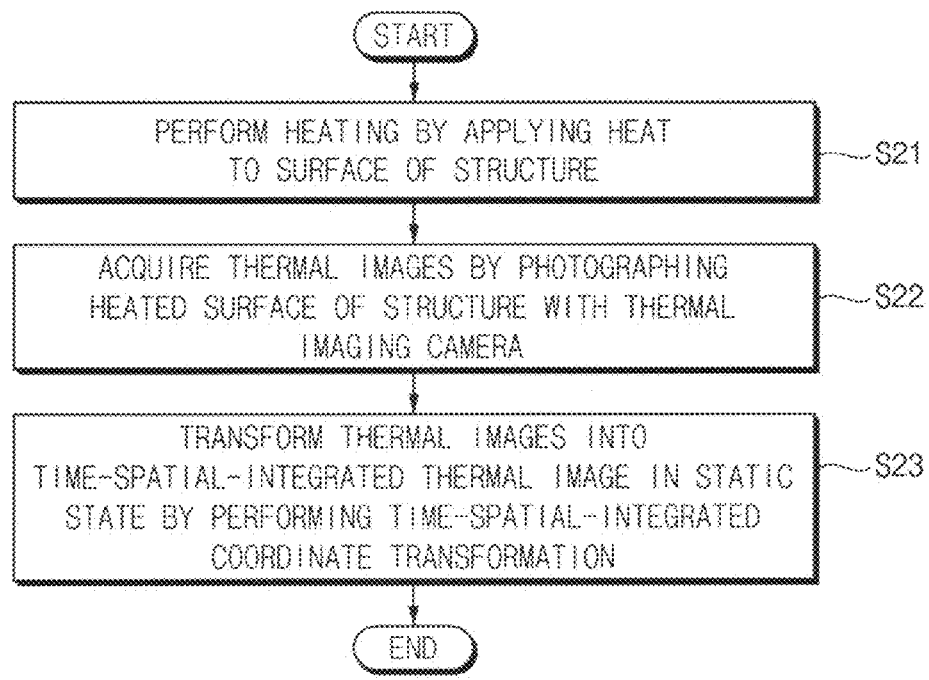
FIG. 3 is a flowchart showing processes of acquiring and preprocessing a thermal image of a surface of the structure by using the coating state evaluation system according to one embodiment of the present disclosure.

Hereinafter, processes of inspecting the deterioration state of the coating and measuring the thickness of the coating (S10 to S70) in the method of inspecting and evaluating the coating state of the structure will be described in more detail. FIG. 3 illustrates processes S20 and S40 of acquiring and preprocessing a thermal image of a structure surface 62 by using the coating state evaluation system 1 according to one embodiment of the present disclosure.

Referring to FIG. 3, in order to acquire the thermal image, first, the structure 60 may be heated by irradiating a heat source to a photographing target region of the structure surface 62 (S21). While the structure 60 is heated, the thermal images may be acquired by photographing the surface 62 of the structure 60 with the thermal imaging camera 20 (S22). The thermal images in the dynamic state may be transformed into the single time-spatial-integrated thermal image in the static state by performing the coordinate transformation according to the TSICT algorithm (S23).

In one exemplary embodiment, in the step S21 of heating the surface 62 of the structure 60 by irradiating the heat source, thermal energy may be transferred to the structure 60 by irradiating, for example, a laser beam 32 generated by the heat source of the exciter 30 to the structure 60. As the transferred thermal energy propagates through the structure 60, the structure 60 may be heated. A degree of the propagation of the thermal energy through the structure 60 may be related to a degree of the deterioration of the coating. Therefore, in order to inspect the coating state by detecting the degree of the propagation of the thermal energy through the structure 60, the thermal image may be acquired by photographing the structure surface 62 with the thermal imaging camera 20.

The acquired thermal image may be transmitted to the control unit 70. The control unit 70 may perform the coordinate transformation of the thermal image by using the TSICT algorithm (S23).

A preprocessing process of reconstructing the thermal images of the surface of the structure 60 into the single time-spatial-integrated thermal image in the static state will be described in more detail. The thermal imaging camera 20 may photograph a region corresponding to a field of view (FOV). When a measurement target region of the structure surface 62 is wider than the FOV region, the entire region of the structure surface 62 may not be captured by performing the photographing once. Similarly, the above fact may also be applied to the vision camera 10. The coating state evaluation system 1 may photograph an entire desired measurement target region of the structure 60 while moving relative to the structure surface 62 by driving the unmanned moving body 42 such as a mobile robot. In this case, the relative movement refers to a case where at least one of the coating state evaluation system 1 and the structure surface 62 moves or both of the coating state evaluation system 1 and the structure surface 62 move.

However, when there is a relative motion between the structure 60 and the coating state evaluation system 1 due to the moving unit 40, a thermal energy propagation phenomenon caused by the irradiation of the thermal energy at a specific position of the structure 60 may not be measured. Since the image is measured while the structure surface 62 and the coating state evaluation system 1 continuously move relative to each other, a temperature change tendency over time caused by applying the linear laser beam 32 at the specific position may not be recognized. In addition, it is difficult to confirm an inspection result for the entire measurement target region. In order to solve such problems, the reconstruction into the time-spatial-integrated thermal image may be performed by using the TSICT algorithm.

The coordinate transformation by the TSICT algorithm may be used for transforming thermal images in a dynamic state into a thermal image in a static state. In this case, the TSICT algorithm may be expressed by Equation (1) as follows.

$$\begin{pmatrix} x^* \\ y^* \\ t^* \end{pmatrix} = \begin{pmatrix} 0 & 0 & v \\ 0 & 1 & 0 \\ 1/v & 0 & 0 \end{pmatrix} \begin{pmatrix} x \\ y \\ t \end{pmatrix} \quad (1)$$

In this case, x and y denote an x-axis and a y-axis in a thermal image before transformation, respectively, and t denotes a time. In addition, x* and y* denote an x-axis and a y-axis in a transformed thermal image, respectively. Further, t* denotes a thermal wave propagating time. In addition, v denotes a relative velocity between a structure 60 and a thermal imaging camera 20.

According to Equation (1), x*, y*, and t* are transformed into x*=tv, y*=y, and t*=x/v, respectively. Through the above transformation, a measurement structure 60 in a dynamic state may be transformed into a measurement structure 60 in a static state. In detail, x-axis data of the thermal image before the transformation may represent a temperature change tendency of the measurement structure 60 over time before and after applying the linear laser beam 32 based on a position of the linear laser beam 32. Therefore, a result of dividing the data located on the x-axis of the thermal image by the relative velocity v may be defined as a time axis (t*) of a region-of-interest (ROI) image. Since the thermal image is acquired by measuring the measurement structure 60 that moves at a constant velocity (v) with respect to the thermal imaging camera 20, a position of the measurement structure 60 at each point of the thermal image may vary over time. Therefore, a result of multiplying data located on a t-axis (the time axis) of the thermal image by the relative velocity v may be defined as a horizontal spatial axis (x*) of the ROI image. Meanwhile, y-axis data of the thermal image may be defined as a vertical spatial axis (y*) of the ROI image without a separate coordinate axis transformation. The single time-spatial-integrated thermal image obtained through the transformation using Equation (1) may be an image representing all regions in which the measurement has been performed, that is, the entire measurement target region. Thermal energy propagation characteristics over time may be recognized through the single time-spatial-integrated thermal image.

The vision image captured simultaneously with the thermal image may be reconstructed into the time-spatial-integrated vision image by performing time-spatial-integrated coordinate transformation by using the same scheme as in the thermal image. In this case, the thermal wave propagating time may adopt a value used in the transformation of the thermal image.

Figure 4:
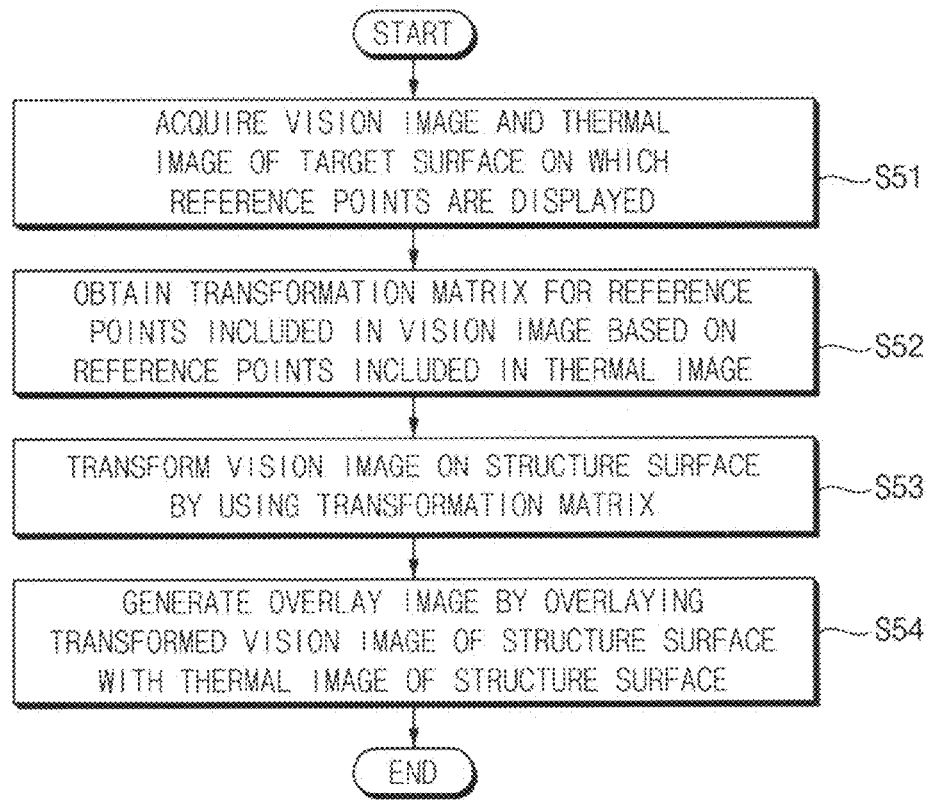
FIG. 4 is a flowchart showing a step of generating an overlay image by overlaying a vision image with the thermal image according to one embodiment of the present disclosure.
Figure 5:
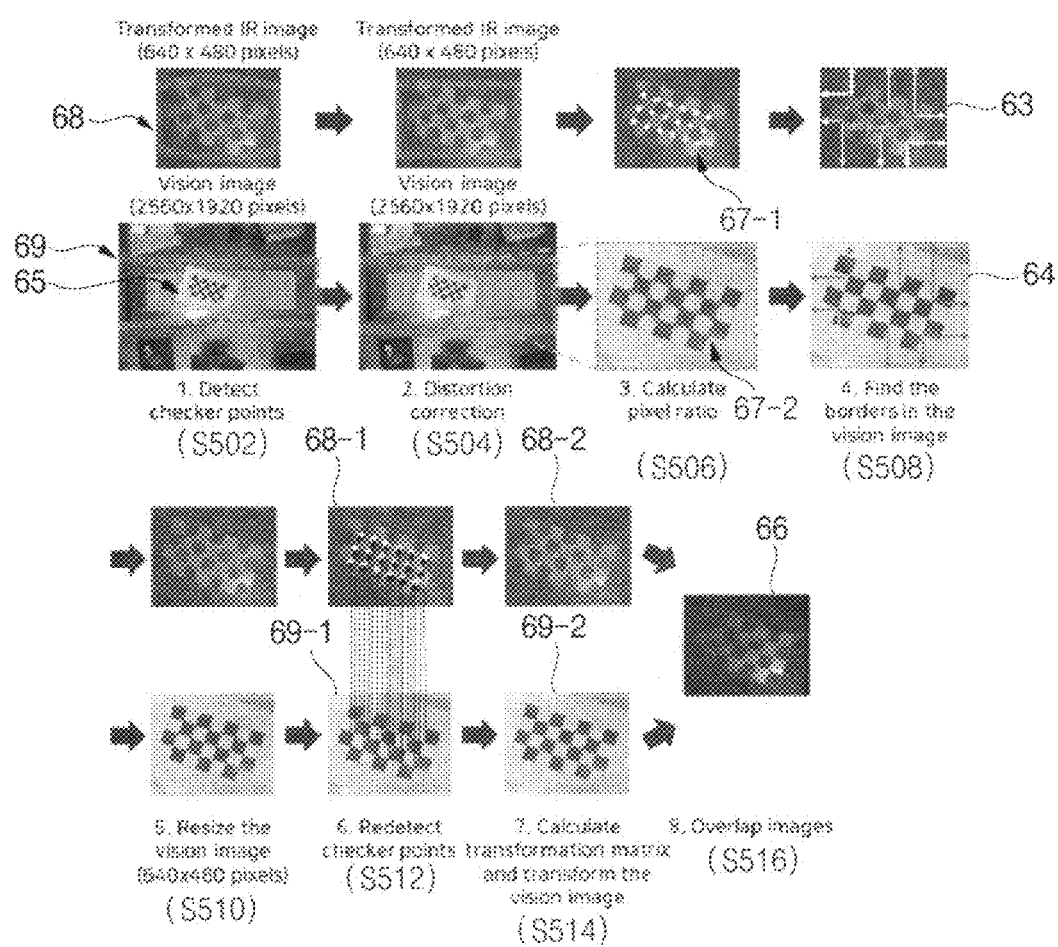
FIG. 5 shows a process of obtaining variables necessary for overlaying the vision image with the thermal image according to one embodiment of the present disclosure.

Next, a flowchart of FIG. 4 shows a specific procedure of generating the overlay image of the vision image and the thermal image, which is obtained through the preprocessing of the time-spatial-integrated coordinate transformation according to the exemplary embodiment (S50). FIG. 5 schematically shows a process of obtaining variables necessary for generating the overlay image of the vision image and the thermal image according to the exemplary embodiment. The reason for obtaining the overlay image of the vision image and the thermal image is that there is a difference in a camera position or a photographing angle between the vision camera 10 and the thermal image camera 20, which is required to be corrected. The process of generating the overlay image will be described in more detail with reference to FIGS. 4 and 5.

The step S50 of generating the overlay image may include acquiring a vision image and a thermal image of a target surface on which reference points are displayed by using the vision camera 10 and the thermal imaging camera 20 (S51). The control unit 70 may receive the vision image and the thermal image provided by photographing the target surface on which the reference points are displayed by using the vision camera 10 and the thermal imaging camera 20, respectively.

Before acquiring an image of the coating of the structure 60 that is an actual inspection target and measuring the structure surface 62, it is necessary to obtain a transformation matrix. To this end, first, a vision image 69 and a thermal image 68 may be acquired for the target surface on which the reference points are displayed. For example, a checkerboard 65 marked with a grid pattern may be attached to the structure surface 62, and a region including the checkerboard 65 may be photographed with the vision camera 10 and the thermal imaging camera 20. In addition, reference points 67-1 and 67-2 may be detected in the thermal image 68 and the vision image 69, respectively (S502). The reference point may be a vertex of the checkerboard image 65, that is, an intersecting point of the grid pattern. In order to detect the reference points 67-1 and 67-2, a feature extraction method may be used, or a checkpoint detection function provided by specific software may be used.

The step S50 of generating the overlay image may include obtaining a transformation matrix for the reference points 67-2 included in the vision image 69 based on the reference points 67-1 included in the thermal image 68 (S52). In order to obtain the transformation matrix, the following processes may be performed.

First, distortions of the thermal image 68 and the vision image 69 may be corrected by using the detected reference points 67-1 and 67-2 (S504). One example of a distortion correction scheme that may be employed includes a MATLAB program, but the present disclosure is not limited thereto, and various other correction techniques may be used. In addition, a pixel ratio may be obtained by using a distance between the detected reference points 67-1 or between the detected reference points 67-2 in the thermal image 68 and the vision image 69 (S506). In this case, the pixel ratio represents how many pixels in the vision image 69 having relatively high image quality correspond to one pixel in the thermal image 68.

A process of cutting the vision image 69 to allow the vision image 69 to have the same region of interest (ROI) as the thermal image 68 having a relatively small region of interest (FOV) may be performed. To this end, an ROI border within the vision image 69 may be calculated (S508). A number of pixels from each of the reference points 67-1 located on an outer periphery within the thermal image 68 to a border (edge) 63 of the thermal image 68 may be obtained, and numbers of pixels from the reference points of the vision image 69 to borders 64 may be obtained by using the previously obtained pixel ratio. A border (edge) corresponding to the ROI of the thermal image 68 may be obtained in the vision image 69 by using the obtained numbers of pixels from the reference points to the borders. Only the ROI of the vision image 69 defined by the border (edge) may be cut. In order to overlay the thermal image with the vision image, the two images are required to have the same number of pixels. In order to overlay the thermal image having a relatively low resolution, the vision image may be reduced by using the previously obtained pixel ratio (S510).

First and second reference points (checkerboard points within the image) may be redetected in the ROIs of the thermal image 68-1 and the reduced vision image 69-1, respectively (S512).

Although the images have the same ROI through the previous border detection, a rotation, a movement, or the like within the image may be required due to a relative position. Measurement image correction may be performed according to the relative position (vertical, horizontal, rotation, etc.) between the thermal imaging camera 20 and the vision camera 10. To this end, the transformation matrix may be obtained by using the redetected reference points. In more detail, the reference points 67-1 included in the thermal image 68-1 may be set as fixed points, and corresponding reference points 67-2 included in the vision image 69-1 may be set as moving points, so that the transformation matrix may be obtained for mating moving points 67-2 based on the fixed points 67-1 (S514). The vision image may be corrected (transformed) by using the obtained transformation matrix. In order to obtain the transformation matrix, a 'dorm' function of MATLAB may be used.

An overlay image 66 may be obtained by overlaying the transformed vision image 69-2 of the structure surface 62 with the thermal image 68-2 obtained for the same structure surface 62 (S516).

When the transformation matrix is obtained as described above, the vision image of the structure surface 62 to be inspected may be transformed by using the transformation matrix. To this end, the step S50 of generating the overlay image may include transforming the vision image of the structure surface 62 by using the transformation matrix (S53). Furthermore, the step S50 of generating the overlay image may include overlaying the transformed vision image of the structure surface 62 with the thermal image of the structure surface 62 by using the transformation matrix obtained in advance as described above (S54).

The corrected vision image having three-dimensional RGB values may be overlaid with the thermal image having one-dimensional measurement data. Although an actual overlay image includes four dimensions (640×480×4), the overlay image may be expressed in three dimensions for visual expression. In this case, the expressed three-dimensional image may be an image obtained by replacing at least one of the RGB values of the vision image with the one-dimensional data of the thermal image. According to the method described in FIG. 5, the overlay image may be obtained by preprocessing an actually measured thermal image and an actually measured vision image by using the variables obtained by using the checkerboard image, and overlaying the preprocessed images with each other. In this case, the variables may include a pixel ratio, positions of reference points, the number of pixels from each of the reference points to a border, a transformation matrix, and the like.

With only the vision image, a state inside the coating may not be recognized. However, when the overlay image of the vision image and the thermal image is used, even the state inside the coating may be recognized, so that such a disadvantage may be compensated. This is because the state inside the coating such as the thickness of the coating may be reflected in the thermal image by affecting the transfer of the thermal energy transfer in the structure 60 as described above.

Figure 6:
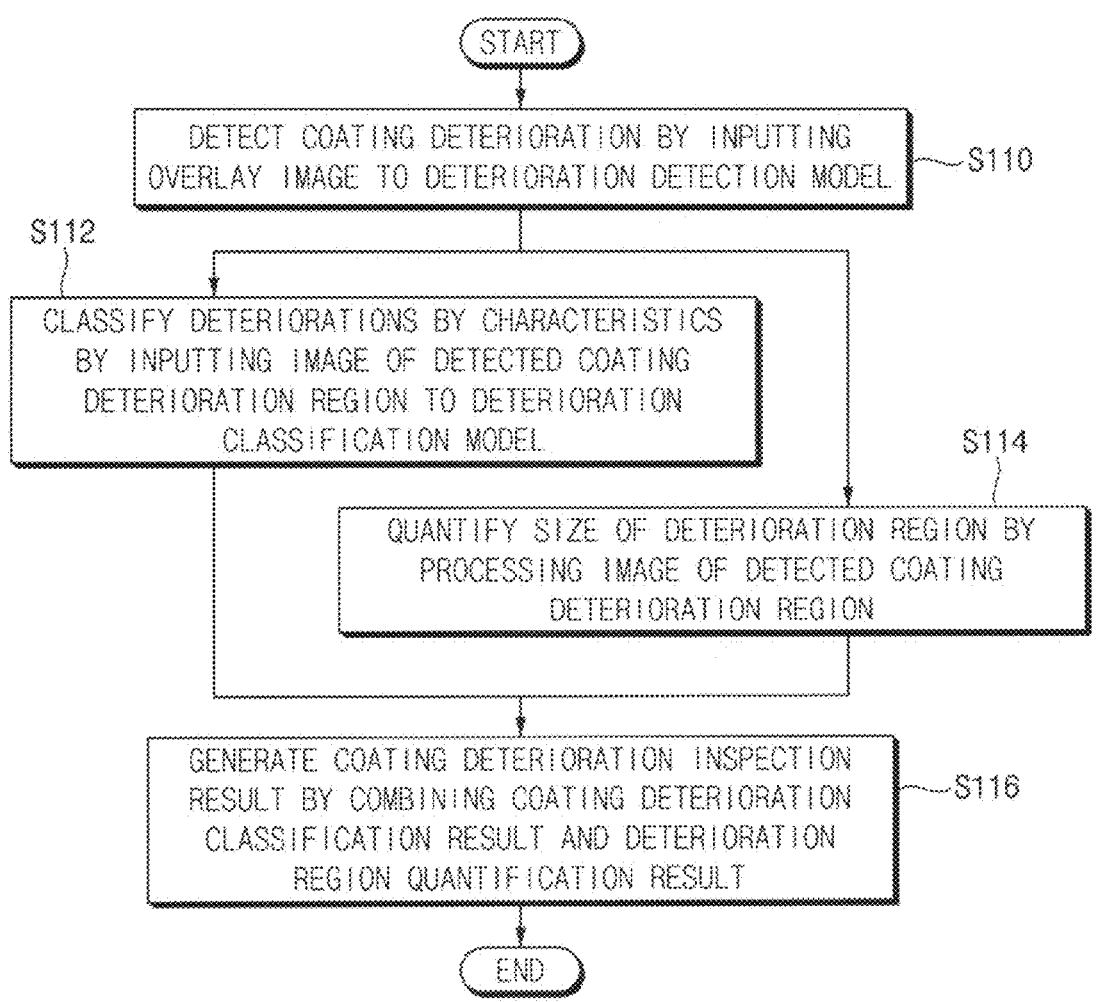
FIG. 6 is a flowchart showing a step of inspecting a deterioration state of a coating of the structure by using a coating deterioration inspection algorithm model according to one embodiment of the present disclosure.

After the overlay image of the thermal image and the vision image for a predetermined region of the structure surface 62 that is an actual inspection target is obtained by the method as described above, the deterioration state of the coating of the structure 60 may be inspected by using the overlay image and a coating deterioration inspection algorithm model. FIG. 6 is a flowchart specifically showing a step S60 of inspecting a deterioration state of a coating of the structure by using a coating deterioration inspection algorithm model according to one embodiment.

The coating deterioration inspection algorithm model may be constructed through machine learning based on an artificial neural network (ANN) in order to detect and classify the deterioration of the coating. In other words, the coating deterioration inspection algorithm model may increase accuracy of the detection and classification of the deterioration included in the coating by learning various images including the deterioration of the coating or an image in a normal state through machine learning in advance. In one embodiment, the coating deterioration inspection algorithm model may include a coating deterioration detection model for detecting the deterioration of the coating, and a coating deterioration classification model for classifying the detected deterioration into corrosion, delamination, checking, chalking, and the like by characteristics. When the deterioration of the coating is detected, a faster region-based convolutional neural network (R-CNN) algorithm may be used in order to shorten an operation time. In addition, when the deterioration is classified, a detection algorithm based on YOLO v2 and a classification algorithm based on a convolutional neural network (CNN) using a VGG16 network may be used in order to increase an operation speed. A machine learning training model may be constructed by using MATLAB that is a commercial program. However, the coating deterioration inspection algorithm model according to the present disclosure is not limited thereto.

Referring to FIG. 6, first, the step S60 of inspecting the deterioration state of the coating may include detecting the deterioration of the coating applied to the structure 60 by inputting the overlay image to the coating deterioration detection model (S110). The coating deterioration detection model may be an artificial intelligence-based coating deterioration detection model constructed by performing machine learning on a plurality of learning overlay images in advance based on an artificial neural network. The coating deterioration detection model may be implemented as a part of the control unit 70. The coating deterioration detection model included in the control unit 70 may be specified by detecting a region in which the coating applied to the structure 60 is deteriorated from the input overlay image. In this case, the deterioration may be defined as a phenomenon that occurs due to a decrease in durability of the coating. The deterioration of the coating may occur as chemical and physical properties of the coating are changed according to internal and external influences of the structure 60.

Figure 7:
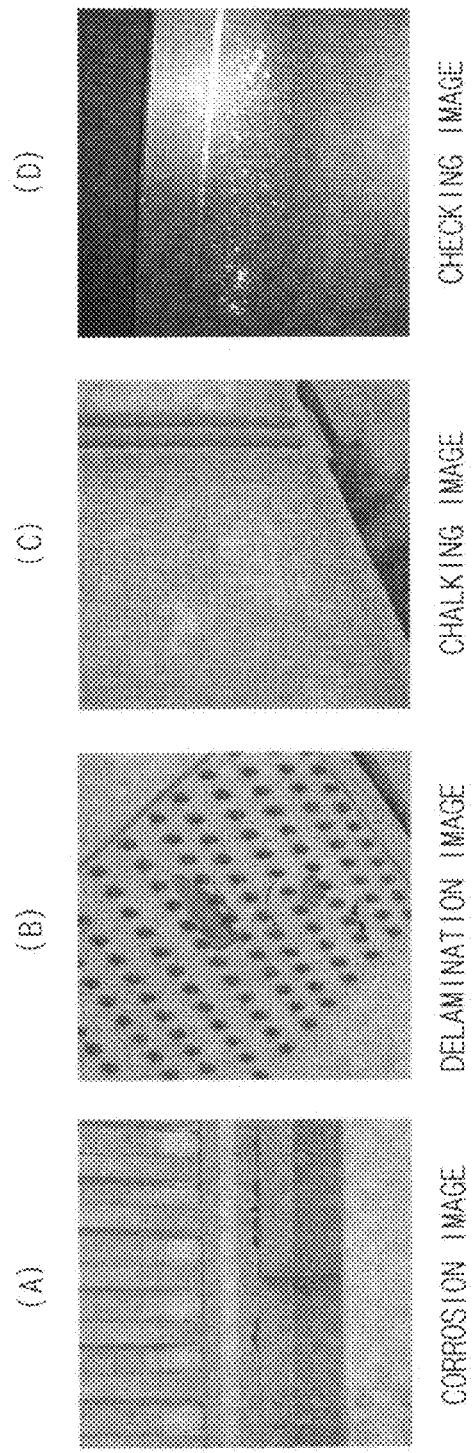
FIG. 7 illustrates a corrosion image, a delamination image, a chalking image, and a checking image of the coating classified according to characteristics of coating deterioration.

In addition, the step S60 of inspecting the deterioration state of the coating may include classifying the deterioration of the coating by characteristics by inputting an image of a coating deterioration region determined according to a position of the detected coating deterioration to the coating deterioration classification model (S112). The coating deterioration classification model may be implemented as a part of the control unit 70. The purpose of classifying the deterioration of the coating by the characteristics is to classify a durability decrease degree of the coating while simultaneously quantifying and evaluating the coating state upon the evaluation of the coating state that will be described below. The coating deterioration may be classified into corrosion, delamination, chalking, and checking according to the characteristics of the coating deterioration. FIG. 7 illustrates a corrosion image, a delamination image, a chalking image, and a checking image of the coating classified according to characteristics of coating deterioration.

Since the overlay image is used for inspecting the coating deterioration, a deterioration phenomenon such as chalking and checking, which were difficult to detect from the vision image, may also be effectively detected and classified.

In a scheme of detecting the deterioration of the coating by separately using the vision image and the thermal image, separate coating deterioration detection has to be performed for each image. There is a disadvantage of lengthening a computing time. In addition, when the overlay image is not used, only the detection of the deterioration may be performed, and it is difficult to accurately classify the detected deterioration according to the characteristics. In contrast, according to the embodiment of the present disclosure, the deterioration of the coating may be detected by using the overlay image that is obtained by overlaying the thermal image with the vision image into one image. Since a scheme of detecting the deterioration of the coating by using the overlay image requires to detect the deterioration only once for the overlay image, there is an advantage of reducing a relatively significant amount of the computing time. Furthermore, the use of the overlay image is much more advantageous in accurately classifying the detected coating deterioration according to the characteristics.

The step S60 of inspecting the deterioration state of the coating may include quantifying a size of the deterioration region by processing the image of the detected coating deterioration region (S114).

In addition to the classification of the coating deterioration, the size of the deterioration region may be quantified by processing the image of the deterioration coating region detected in the step S110 (S114). To this end, the deterioration inspection algorithm model of the control unit 70 may include an image processing function for extracting only the deterioration region from detected box-shaped deterioration regions and quantifying the extracted deterioration region.

Figure 8:
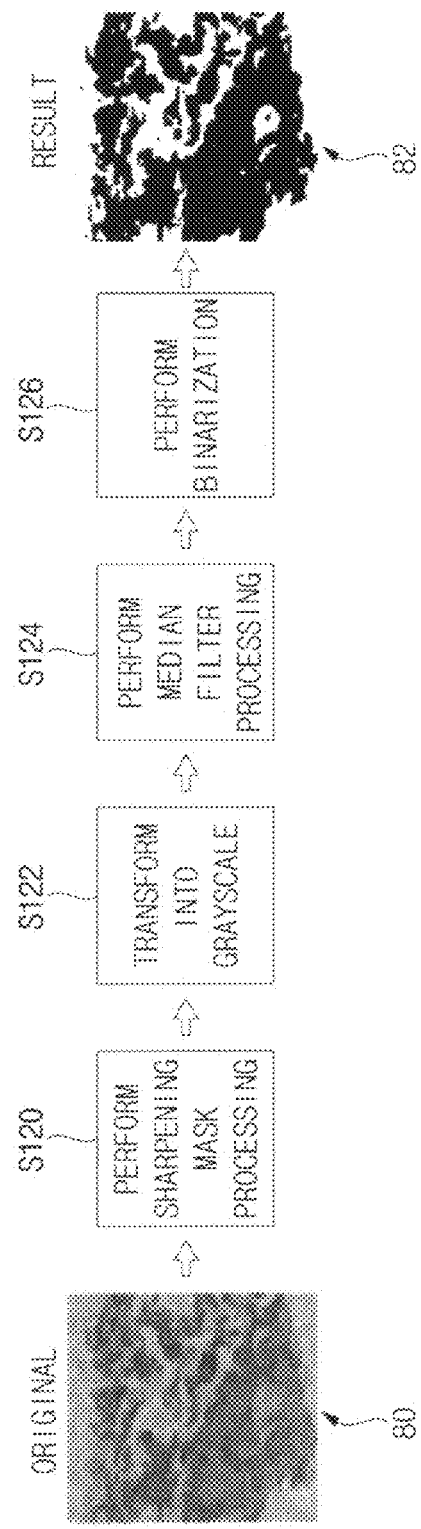
FIG. 8 illustrates an image processing process of quantifying a detected deterioration region according to one embodiment of the present disclosure.

FIG. 8 illustrates an image processing process of quantifying a detected deterioration region according to one embodiment of the present disclosure.

Referring to FIG. 8, the step S114 of quantifying the size of the coating deterioration region may include: performing a process of emphasizing a feature of an overlay image 80 including an image color by using a sharpening mask (S120); and transforming the overlay image 80 in which the feature is emphasized into a grayscale image (S122). The purpose of performing the transformation into the grayscale image is to reduce a weight of the RGB values of the vison image. In addition, the step S114 of quantifying the size of the coating deterioration region may include: filtering the image transformed into grayscale by applying a median filter having a predetermined size (e.g., a 3×3 size) to the image transformed into grayscale (S124); and generating a black-and-white image 82 in which each pixel has a value of 0 or 1 by binarizing the filtered image (S126). In the black-and-white image 82, each pixel may have a value of 0 or 1 depending on whether the pixel corresponds to the deterioration region. For example, 0 may represent a normal region, and 1 may represent the deterioration region. According to specific setting of variables, 1 may represent the normal region, and 0 may represent the deterioration region. A deterioration area may be quantified by counting the number of pixels corresponding to the deterioration region and multiplying the counted number of pixels by a pixel resolution that is previously obtained.

Figure 9:
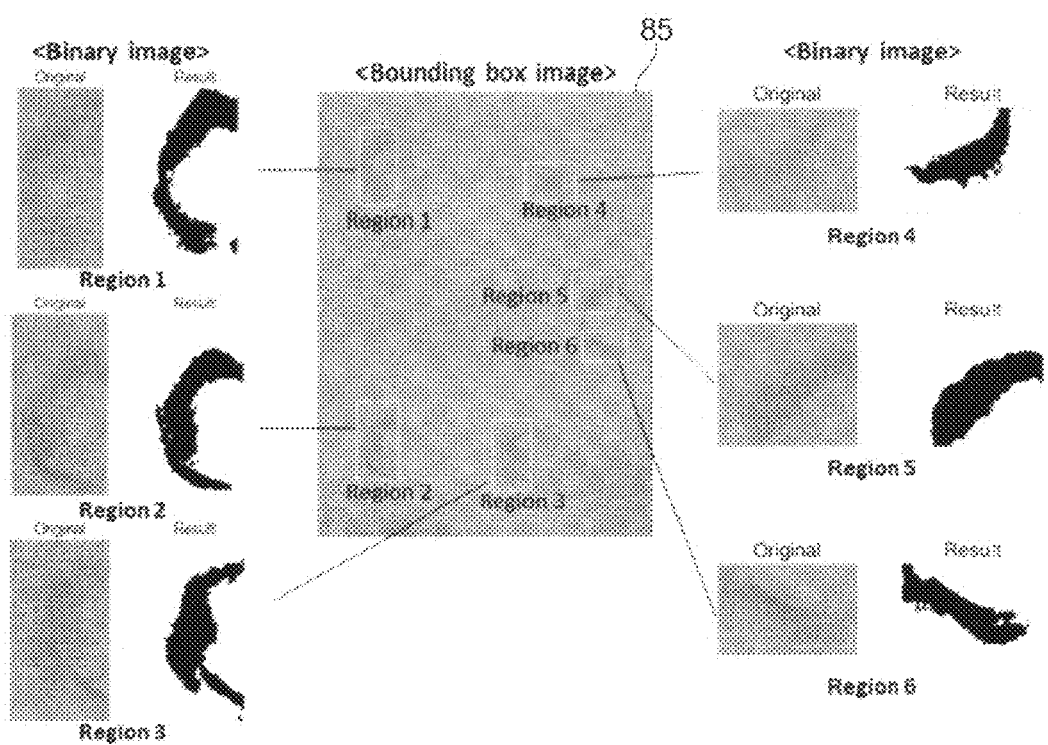
FIG. 9 illustrates extraction of a deterioration area through image processing according to one embodiment of the present disclosure.

FIG. 9 shows extraction of a deterioration area through image processing according to an exemplary embodiment. Referring to FIG. 9, a case where six deterioration regions Region 1 to Region 6 are detected in a single overlay image is illustrated. Deterioration regions (Region 1 to Region 6: Result) binarized by performing the image processing on original overlay images Original for the deterioration regions Region 1 to Region 6, respectively, may be extracted through the above-described processes (S120, S122, S124, and S126). A deterioration area for each of the binarized deterioration regions extracted as described above may be calculated.

The step S60 of inspecting the deterioration state of the coating may include generating a coating deterioration inspection result (S116). The coating deterioration inspection result may include a result of classifying the coating deterioration by the characteristics and a quantification result, which are obtained as described above. The control unit 70 may store data related to a calculated coating deterioration inspection result.

Meanwhile, referring again to FIG. 2, the method of inspecting the coating state of the structure 60 may include the step S70 of inspecting the thickness of the coating applied to the structure surface 62. In one embodiment, the control unit 70 may measure the thickness of the coating of the structure 60 by analyzing the thermal energy measured from the preprocessed thermal image (S70). The coating thickness inspection algorithm may be used to measure the thickness of the coating.

In order to measure the thickness of the coating, first, a thermal image of a heated region may be captured while the structure 60 is heated. In detail, in order to heat the structure 60, the heat source of the exciter 30 may be irradiated to the desired region of the structure 60. Accordingly, the thermal energy may be applied to the structure 60. The thermal energy may propagate in a thickness direction of the coating that constitutes the structure surface 62. The thermal energy may be reflected at a point where physical properties of a medium through which the thermal energy propagates change, that is, at an interface between the structure 60 and the coating so as to propagate back in a direction toward the coating surface 62. The thermal energy may be reflected due to a difference in thermal conductivity between the structure 60 and the coating. When thermal conductivity k1 of the coating is significantly small as compared with thermal conductivity k2 of the structure 60 (i.e., k1<<k2), a reflectance of the thermal energy at the interface may be close to 100%.

The thermal imaging camera 20 may provide the control unit 70 with the thermal image acquired by photographing the region of the structure 60 heated by the thermal energy. The control unit 70 may measure the thickness of the coating by using the coating thickness inspection algorithm. In detail, the control unit 70 may measure the thermal energy reflected after the heating by analyzing the thermal image. The thickness of the coating may be calculated by applying the measured thermal energy to Fourier's heat conduction equation expressed by Equation (2) as follows.

$$L = Q/kA\Delta T t^* \quad (2)$$

In this case, Q denotes thermal energy reflected after heating, $\Delta T$ denotes a temperature increment of a coating caused by an applied heat source of an exciter 30, k denotes thermal conductivity of a coating, L denotes a thickness of a coating, and $t^*$ denotes a thermal wave propagating time. In this case, $t^*$ is required to be selected as an appropriate value based on the Fourier's heat conduction equation.

The thickness of the coating measured as described above may include various noise components that are irrelevant to the measurement of the thickness. Noise may be generated by an ambient external heat source that is irrelevant to the measurement of the thickness, for example, solar heat or an ambient heating element, and various outdoor air conditions (temperature and/or humidity conditions of ambient air, etc.). Such noise may also be included in the thermal image before applying the thermal energy through the heat source of the exciter 30. Thermal reactions caused by such external noise heat sources have to be removed from the integrated thermal image.

According to the exemplary embodiment, a time-spatial-integrated thermal image captured before the thermal energy of the heat source, that is, the linear laser beam 32 is applied to the measurement structure 60 may be subtracted from a time-spatial-integrated thermal image captured while the linear laser beam 32 is applied to the structure 60. In other words, a first time-spatial-integrated thermal image may be generated by capturing a thermal image of the structure 60 immediately before the heat source is applied to the structure 60, and performing the time-spatial-integrated coordinate transformation. Then, a second time-spatial-integrated thermal image may be generated by capturing a thermal image while the heat source is applied to the structure 60, and performing the time-spatial-integrated coordinate transformation. Thermal images caused by the noise heat sources may commonly exist in the first and second time-spatial-integrated thermal images. Therefore, a third time-spatial-integrated thermal image obtained by subtracting the first time-spatial-integrated thermal image from the second time-spatial-integrated thermal image may be a thermal image to be obtained, from which noise of the external heat sources is removed.

The control unit 70 may calculate an accurate thickness of the coating by using the thermal image from which the noise component is removed. In addition, the calculated thickness of the coating of the structure 60 may be visualized or quantified, and results thereof may be used as input data upon the evaluation of the coating state that will be described below.

Figure 10:
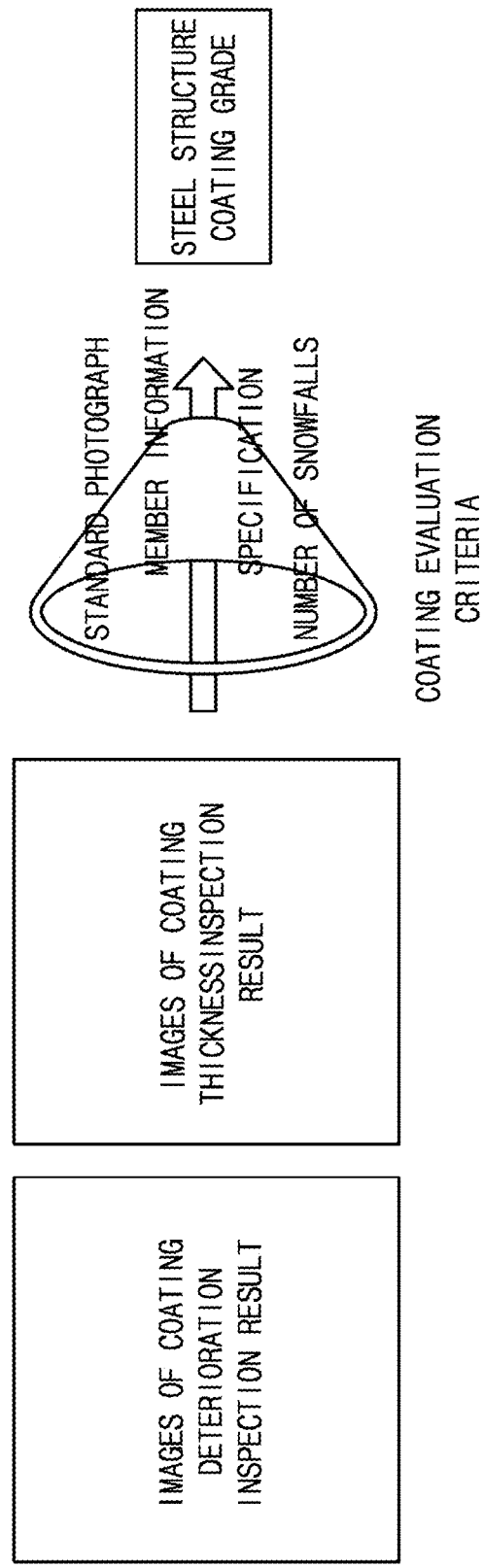
FIG. 10 schematically shows a method of evaluating a coating state of a structure according to one embodiment of the present disclosure.

Meanwhile, the method of inspecting and evaluating the coating state of the structure according to the exemplary embodiment may further include calculating a grade of the coating by comprehensively evaluating the coating state by using a coating deterioration inspection result obtained in the step S60 and a coating thickness inspection result obtained in the step S70 (S80). FIG. 10 schematically shows a method of evaluating a coating state of a structure 60.

Referring to FIG. 10, the control unit 70 of the coating state evaluation system 1 may perform comprehensive evaluation of the coating state, such as automatic calculation of the coating grade of the structure 60, by evaluating a coating thickness measurement result and a coating deterioration state inspection result described above based on a predetermined coating evaluation criterion. The coating evaluation criterion may be a coating evaluation criterion for each structure to be inspected, such as "detailed guidelines for implementing safety and maintenance of facilities". As one example, the coating evaluation criterion may include at least one of an image of the structure surface 62 in a normal state, member information of the structure 60, a specification, and a number of snowfalls. The coating grade reflecting specificity of the structure 60 may be calculated by evaluating the thickness of the coating or a degree of the deterioration state based on such an evaluation criterion.

In detail, a grade and a score for each type of the deterioration may be calculated by using a deterioration area for each type of the deterioration obtained in the coating deterioration inspection. In this case, the grade and the score may be calculated through comparison with a standard photograph (a photograph that is a basis for calculating the grade (severity) of the deterioration) given in an inspection criterion, and by using a ratio of the deterioration area to an entire inspection area. Thereafter, the grade and the score for the deterioration of the coating may be calculated by applying a weight for each type of the deterioration, which is given in the inspection criterion. In addition, a grade and a score of the thickness of the coating may be calculated by calculating a dissatisfaction rate by comparing an allowable coating thickness for each structure with a measured coating thickness value.

In addition to the inspection result obtained from the coating state evaluation system 1, a grade and a score for an external factor including at least one of the member information of the structure, the specification, and the number of snowfalls may be calculated.

For example, a grade and a score of the structure may be calculated by using the grade and the score for the coating deterioration, the grade and the score for the thickness of the coating, the grade and the score for the external factor. The coating grade reflecting the specificity of the structure may be calculated by evaluating the thickness of the coating or the degree of the deterioration state based on such an evaluation criterion.

In this case, the coating grade may be a quantitative or qualitative index. The coating grade may be calculated through an evaluation algorithm model preset in the control unit 70. Through such a process, the evaluation may be performed according to a predetermined criterion while subjectivity of a creator is not involved. Accordingly, an objective coating grade may be calculated.

Figure 11:
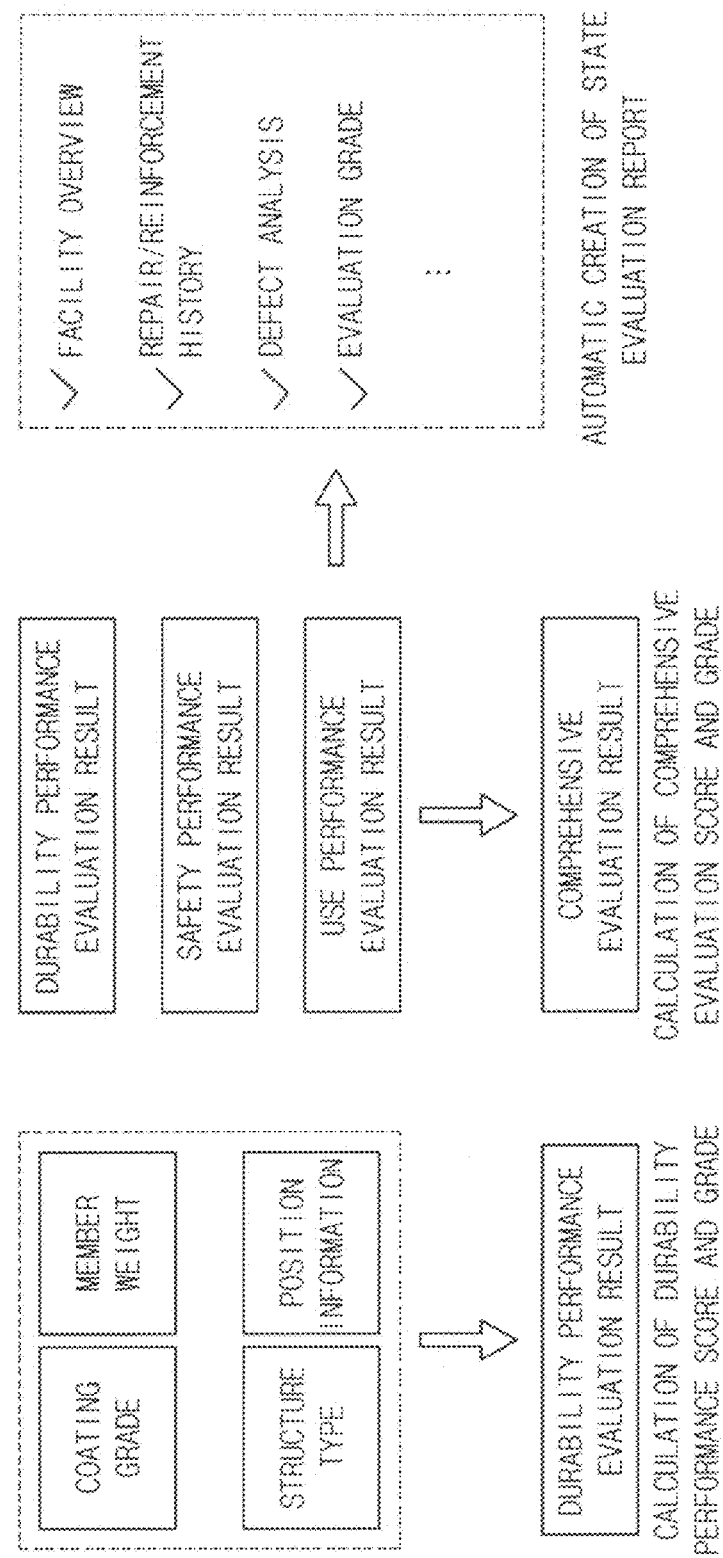
FIG. 11 illustrates a process of automatically creating a coating state evaluation report of the structure by using the coating state evaluation system according to one embodiment of the present disclosure.

FIG. 11 illustrates a process of automatically creating a coating state evaluation report of the structure by using the coating state evaluation system according to one embodiment of the present disclosure.

Referring to FIG. 11, the control unit 70 may automatically create a structure state evaluation report by using additional information related to the structure and the coating grade calculated in the previous step S70 as input variables (S90).

In this case, the additional information related to the structure may include at least one of a structure type, a weight according to a member, and position information, but the additional information is not limited to the above-described items. In other words, much additional information may be included according to a direction or a criterion of creation.

In the exemplary embodiment, in addition to the calculated coating grade, durability performance (a score and a grade for durability) of the structure 60 may be evaluated by using the additional information related to the structure 60. Furthermore, safety performance evaluation and use performance evaluation may be performed on the structure 60. A comprehensive evaluation score and a comprehensive evaluation grade may be calculated by combining a durability performance evaluation result of the structure 60 with a safety performance evaluation result and a use performance evaluation result.

By using the above evaluation results, a comprehensive state evaluation report for the structure 60 and the coating may be automatically created based on a report creation scheme specified in a grade calculation criterion such as a specification. In this case, an overview and a history of a facility, a conventional repair/reinforcement history, and the like may be stored in a database (DB) so as to be automatically input. The automatically created state evaluation report may include information on input data (a facility overview, a repair/reinforcement history, defect analysis, an evaluation grade, etc.).

The structure type, the coating grade, the deterioration grade, and a final safety grade of the structure may be described in the above report automatically created by comprehensively considering the additional information and the coating grade.

The processes of inspecting the deterioration state of the coating and measuring the thickness of the coating (S30 to S70) as described above may be implemented as a computer program. In addition, the step S80 of calculating the grade of the coating and the step S90 of automatically creating the structure state evaluation report may also be implemented as a computer program. The computer program may be implemented in the form of an executable file, and stored in a computer-readable recording medium. The control unit 70 may execute the computer program file stored in the recording medium to accurately evaluate the states of the structure and the coating applied thereto, and to automatically create related reports.

As described above, since the structure state evaluation report is automatically created by the coating state evaluation system 1, objectivity of the report may be improved, and a problem of work efficiency caused by conventional handwriting may be improved.

Although one embodiment of the present disclosure has been described above, the idea of the present disclosure is not limited to the embodiments presented herein. In addition, those skilled in the art who understand the idea of the present disclosure may easily propose other embodiments by supplement, change, deletion, addition, or the like of components within the scope of the same idea, and these embodiments shall also be construed to fall within the scope of the idea of the present disclosure.

What is claimed is:

1. A method of inspecting and evaluating a coating state of a steel structure, in which the method is for inspecting a coating state of an inspection target steel structure to which a coating is applied, the method comprising:
   acquiring a plurality of vision images by photographing a desired region of a surface of the steel structure by using a vision camera;
   acquiring a plurality of thermal images by heating the desired region of the steel structure and photographing the heated desired region of the surface of the steel structure by using a thermal imaging camera;
   performing preprocessing of reconstructing the thermal images and the vision images in a dynamic state into a time-spatial-integrated thermal image and a time-spatial-integrated vision image in a static state, respectively, by performing coordinate transformation according to a time-spatial-integrated coordinate transformation (TSICT) algorithm;
generating an overlay image by overlaying the time-spatial-integrated vision image with the time-spatial-integrated thermal image;
detecting deterioration of the coating applied to the steel structure by inputting the overlay image to an artificial intelligence-based coating deterioration detection model constructed by learning a plurality of learning overlay images in advance based on an artificial neural network;
classifying the deterioration of the coating of the steel structure by characteristics by inputting an image of a coating deterioration region determined according to a position of the detected coating deterioration to a coating deterioration classification model;
quantifying a size of the deterioration region by processing the image of the coating deterioration region;
generating a coating deterioration inspection result by combining a result of classifying the coating deterioration by the characteristics and a quantification result;
inspecting a thickness of the coating of the steel structure by analyzing thermal energy measured from the time-spatial-integrated thermal image based on a coating thickness inspection algorithm; and
calculating a coating grade by comprehensively evaluating a deterioration state inspection result of the coating and a thickness inspection result of the coating based on a predetermined coating evaluation criterion.

2. The method of claim 1, wherein the predetermined coating evaluation criterion includes at least one of an image of the surface of the steel structure in a normal state, member information of the steel structure, a specification, and a number of snowfalls.

3. The method of claim 1, further comprising automatically creating a state evaluation report for the steel structure by combining the calculated coating grade with additional information related to the steel structure.

4. The method of claim 3, wherein the automatically creating of the state evaluation report includes:
evaluating durability performance of the steel structure by using the calculated coating grade and the additional information related to the steel structure as input variables;
evaluating safety performance and use performance of the steel structure;
calculating a comprehensive evaluation score and a comprehensive evaluation grade for the steel structure by combining a durability performance evaluation result of the steel structure with a safety performance evaluation result and a use performance evaluation result of the steel structure; and
automatically creating a comprehensive state evaluation report for the steel structure and the coating according to a predetermined report creation scheme.

5. The method of claim 1, wherein the coating deterioration is classified into corrosion, delamination, checking, and chalking according to the characteristics of the coating deterioration.

6. The method of claim 1, wherein the desired region is photographed while the vision camera, a heat source, and the thermal imaging camera are mounted together on an unmanned moving body and move relatively to the surface of the steel structure.

7. The method of claim 1, wherein the generating of the overlay image includes:

acquiring a vision image and a thermal image of a target surface on which reference points are displayed by photographing the target surface by using the vision camera and the thermal imaging camera, respectively;
obtaining a transformation matrix for the reference points included in the vision image based on the reference points included in the thermal image;
transforming the vision image of the surface of the steel structure by using the transformation matrix; and
obtaining the overlay image by overlaying the transformed vision image of the surface of the steel structure with the thermal image of the surface of the steel structure.

8. The method of claim 7, wherein the obtaining of the transformation matrix includes:
detecting first reference points and second reference points within the thermal image and the vision image, respectively;
correcting distortions of the thermal image and the vision image by using the detected first reference points and the detected second reference points, respectively;
obtaining a pixel ratio by using distances between the first reference points and between the second reference points in the thermal image and the vision image that are subject to the distortion correction;
cutting a region of interest (ROI) of the vision image corresponding to an ROI of the thermal image;
allowing the cut ROI of the vision image to have a same number of pixels as the ROI of the thermal image by reducing the cut ROI of the vision image according to the pixel ratio;
redetecting the first reference points and the second reference points in the regions of interest of the thermal image and the vision image, respectively; and
setting the redetected first reference points and the redetected second reference points as fixed points and moving points, respectively, to obtain the transformation matrix for mating moving points based on the fixed points.

9. The method of claim 8, wherein the cutting of the ROI of the vision image includes:
obtaining numbers of pixels from the first reference points of the thermal image to borders of the thermal image;
calculating numbers of pixels from the second reference points to borders within the vision image by using the obtained numbers of pixels and the pixel ratio;
obtaining a border corresponding to the ROI of the thermal image in the vision image by using the calculated numbers of pixels from the second reference points to the borders; and
cutting only the ROI of the vision image defined by the obtained border.

10. The method of claim 1, wherein the quantifying of the size of the deterioration region includes:
performing a process of emphasizing a feature of the overlay image including an image color by using a sharpening mask;
transforming the overlay image in which the feature is emphasized into a grayscale overlay image;
filtering the overlay image transformed into grayscale by applying a median filter having a predetermined size to the overlay image transformed into grayscale;
generating a black-and-white image in which each pixel has a value of 0 or 1 depending on whether the pixel corresponds to the deterioration region by binarizing the filtered overlay image;

counting a number of pixels corresponding to the deterioration region in the black-and-white image; and quantifying a size of a deterioration area by multiplying the counted number of pixels by a pixel resolution.

11. The method of claim 1, wherein the inspecting of the thickness of the coating of the steel structure includes:

removing a thermal image component caused by a noise heat source by subtracting a time-spatial-integrated thermal image captured before thermal energy of a heat source is applied to the steel structure from a time-spatial-integrated thermal image captured while the thermal energy of the heat source is applied to the steel structure; and measuring the thickness of the coating of the steel structure by using the time-spatial-integrated thermal image from which a noise component is removed based on Fourier's heat conduction equation expressed by $L=Q/k A \Delta T t^*$, where Q denotes thermal energy reflected after heating, $\Delta T$ denotes a temperature increment of a coating caused by an applied heat source, k denotes thermal conductivity of a coating, L denotes a thickness of a coating, and $t^*$ denotes a thermal wave propagating time.

12. A system for inspecting and evaluating a coating state of a steel structure, the system comprising:

a vision camera configured to acquire a plurality of vision images by photographing a desired region of a surface of an inspection target steel structure to which a coating is applied;

an exciter configured to heat the steel structure by irradiating a heat source to the steel structure;

a thermal imaging camera configured to acquire a plurality of thermal images by photographing the desired region of the surface of the steel structure heated by the exciter;

a moving unit including an unmanned moving body configured to provide a movement while maintaining a desired interval with respect to the surface of the steel structure in a state where the vision camera, the thermal imaging camera, and the exciter are mounted on the unmanned moving body so as to allow the vision camera and the thermal imaging camera to photograph the desired region, and a moving body controller configured to control the movement of the unmanned moving body; and a control unit configured to execute a computer program to inspect the coating state of the steel structure, wherein the computer program includes:

a preprocessing function of reconstructing the thermal images and the vision images in a dynamic state, which are provided by the vision camera and the thermal imaging camera, into a time-spatial-integrated thermal image and a time-spatial-integrated vision image in a static state, respectively, by performing coordinate transformation according to a time-spatial-integrated coordinate transformation (TSICT) algorithm;

a function of generating an overlay image by overlaying the time-spatial-integrated vision image with the time-spatial-integrated thermal image;

a function of detecting deterioration of the coating applied to the steel structure by inputting the overlay image to an artificial intelligence-based coating deterioration detection model constructed by learning a plurality of learning overlay images in advance based on an artificial neural network;

a function of classifying the deterioration of the coating of the steel structure by characteristics by inputting an image of a coating deterioration region determined according to a position of the detected coating deterioration to a coating deterioration classification model;

a function of quantifying a size of the deterioration region by processing the image of the coating deterioration region;

a function of generating a coating deterioration inspection result by combining a result of classifying the coating deterioration by the characteristics and a quantification result;

a function of inspecting a thickness of the coating of the steel structure by analyzing thermal energy measured from the time-spatial-integrated thermal image based on a coating thickness inspection algorithm; and a function of calculating a coating grade by comprehensively evaluating a deterioration state inspection result of the coating and a thickness inspection result of the coating based on a predetermined coating evaluation criterion.

13. The system of claim 12, wherein the computer program further includes a function of automatically creating a state evaluation report for the steel structure by combining the calculated coating grade with additional information related to the steel structure.

14. The system of claim 13, wherein the function of automatically creating the state evaluation report includes:

a function of evaluating durability performance of the steel structure by using the calculated coating grade and the additional information related to the steel structure as input variables;

a function of evaluating safety performance and use performance of the steel structure;

a function of calculating a comprehensive evaluation score and a comprehensive evaluation grade for the steel structure by combining a durability performance evaluation result of the steel structure with a safety performance evaluation result and a use performance evaluation result of the steel structure; and a function of automatically creating a comprehensive state evaluation report for the steel structure and the coating according to a predetermined report creation scheme.

15. The system of claim 12, wherein the unmanned moving body includes a mobile robot having at least one wheel formed of a permanent magnet and configured to move while being attached to the steel structure by an attractive force that acts between the permanent magnet wheel and the steel structure.

16. The system of claim 12, wherein the function of generating the overlay image includes:

a function of receiving a vision image and a thermal image provided by photographing a target surface on which reference points are displayed by the vision camera and the thermal imaging camera, respectively;

a function of obtaining a transformation matrix for the reference points included in the vision image based on the reference points included in the thermal image;

a function of transforming the vision image of the surface of the steel structure by using the transformation matrix; and a function of obtaining the overlay image by overlaying the transformed vision image of the surface of the steel structure with the thermal image of the surface of the steel structure.

17. The system of claim 16, wherein the function of obtaining the transformation matrix includes:
- a function of detecting first reference points and second reference points within the thermal image and the vision image, respectively;
- a function of correcting distortions of the thermal image and the vision image by using the detected first reference points and the detected second reference points, respectively;
- a function of obtaining a pixel ratio by using distances between the first reference points and between the second reference points in the thermal image and the vision image that are subject to the distortion correction;
- a function of cutting a region of interest (ROI) of the vision image corresponding to an ROI of the thermal image;
- a function of allowing the cut ROI of the vision image to have a same number of pixels as the ROI of the thermal image by reducing the cut ROI of the vision image according to the pixel ratio;
- a function of redetecting the first reference points and the second reference points in the regions of interest of the thermal image and the vision image, respectively; and
- a function of setting the redetected first reference points and the redetected second reference points as fixed points and moving points, respectively, to obtain the transformation matrix for mating moving points based on the fixed points.

18. The system of claim 12, wherein the function of quantifying the size of the deterioration region includes:
- a function of performing a process of emphasizing a feature of the overlay image including an image color by using a sharpening mask;
- a function of transforming the overlay image in which the feature is emphasized into a grayscale overlay image;
- a function of filtering the overlay image transformed into grayscale by applying a median filter having a predetermined size to the overlay image transformed into grayscale;
- a function of generating a black-and-white image in which each pixel has a value of 0 or 1 depending on whether the pixel corresponds to the deterioration region by binarizing the filtered overlay image;
- a function of counting a number of pixels corresponding to the deterioration region in the black-and-white image; and
- a function of quantifying a size of a deterioration area by multiplying the counted number of pixels by a pixel resolution.

19. The system of claim 12, wherein the function of inspecting the thickness of the coating of the steel structure includes:
- a function of removing a thermal image component caused by a noise heat source by subtracting a time-spatial-integrated thermal image captured before thermal energy of a heat source is applied to the steel structure from a time-spatial-integrated thermal image captured while the thermal energy of the heat source is applied to the steel structure; and
- a function of measuring the thickness of the coating of the steel structure by using the time-spatial-integrated thermal image from which a noise component is removed based on Fourier's heat conduction equation expressed by $L=Q/kA\Delta Tt^*$, where Q denotes thermal energy reflected after heating, $\Delta T$ denotes a temperature increment of a coating caused by an applied heat source, k denotes thermal conductivity of a coating, L denotes a thickness of a coating, and $t^*$ denotes a thermal wave propagating time.

20. The system of claim 12, further comprising:
a display for displaying an image provided by the control unit; and
a driving check camera mounted on the unmanned moving body to capture an image of a region where the unmanned moving body is to be driven and provide the captured image to the control unit in real time so that the captured image is displayed on the display.

* * * * *